(12) United States Patent
Kapoor et al.

(10) Patent No.: US 12,175,887 B2
(45) Date of Patent: Dec. 24, 2024

(54) HUMAN HEART BEAT SIMULATION APPARATUS

(71) Applicants: Krish Kapoor, Orlando, FL (US); Saumya Kapoor, Orlando, FL (US)

(72) Inventors: Krish Kapoor, Orlando, FL (US); Saumya Kapoor, Orlando, FL (US)

(73) Assignee: Krish Kapoor, Orlando, FL (US)

( * ) Notice: Subject to any disclaimer, the term of this patent is extended or adjusted under 35 U.S.C. 154(b) by 808 days.

(21) Appl. No.: 17/396,790

(22) Filed: Aug. 9, 2021

(65) Prior Publication Data
US 2021/0366313 A1 Nov. 25, 2021

(51) Int. Cl.
*G09B 23/32* (2006.01)
*B33Y 80/00* (2015.01)

(52) U.S. Cl.
CPC .............. *G09B 23/32* (2013.01); *B33Y 80/00* (2014.12)

(58) Field of Classification Search
CPC .................................. G09B 23/32; B33Y 80/00
See application file for complete search history.

(56) References Cited

U.S. PATENT DOCUMENTS

| | | | | |
|---|---|---|---|---|
| 5,482,472 A | * | 1/1996 | Garoni | G09B 23/30 345/83 |
| 5,947,744 A | * | 9/1999 | Izzat | G09B 23/285 434/262 |
| 10,864,659 B1 | * | 12/2020 | Zaneveld | G09B 23/30 |
| 2008/0138780 A1 | * | 6/2008 | Eggert | G09B 23/28 434/266 |
| 2015/0083121 A1 | * | 3/2015 | Fisher | A61M 16/0051 128/205.13 |
| 2018/0218645 A1 | * | 8/2018 | Stump | G09B 23/28 |

FOREIGN PATENT DOCUMENTS

WO  WO-2018126254 A1 * 7/2018 ............. G09B 23/00

\* cited by examiner

*Primary Examiner* — Dmitry Suhol
*Assistant Examiner* — Andrew Michael Boyd

(57) ABSTRACT

Human heart beat simulation apparatus. The human heart beat simulation apparatus comprises a microcontroller, a heart model, a servo motor and a display. The heart model is configured to simulate a heartbeat. The servo motor is coupled to the heart model. The servo motor enables the simulation of the heart beat by the heart model. The apparatus further comprises a control switch and a toggle switch. The control switch is connected to the microcontroller and the servo motor. The control switch is configured to select a heartbeat rate of the heart model. The toggle switch is connected to the microcontroller and the servo motor. The toggle switch is configured in such a way that, activation of the toggle switch causes an irregular heart beat rate of the heart model. The display is configured to display the heart beat rate of the heart model.

12 Claims, 6 Drawing Sheets

HUMAN HEART BEAT SIMULATION APPARATUS

BACKGROUND

Unless otherwise indicated herein, the materials described in this section are not prior art to the claims in this application and are not admitted to being prior art by inclusion in this section.

FIELD OF INVENTION

The subject matter in general relates to medical learning kits. More particularly, but not exclusively, the subject matter is directed to an apparatus configured to simulate human heart beat.

DISCUSSION OF RELATED ART

Heart rate pertains to rate at which the heart beats and is generally denoted by number of contractions of the heart per minute, i.e., beats per minute (bpm). The normal human heart beat rate is 60-100 bpm. A medical condition where the heart beat rate is irregular is referred as "arrhythmia". This corresponds to a state at which the heart beats inconsistently and may result in potentially life-threatening situations.

With the advancement of medical science, medical schools and institutions are under thrust to train students as well as new doctors. Due to the limited resources, medical schools have to rely on human-interactive devices to teach health care providers with the skills required to successfully analyse patients and monitor their vitals. One such crucial skill is monitoring the heart beat rate of a human and to determine if there is any irregularity in the heart beat rate. However, most medical schools do not have provisions to direct patient training/teaching. This may result in upcoming health care providers to not be equipped to effectively detect abnormalities in heart beat rates.

Conventionally, several devices have been constructed to simulate heart beats, but the simulations generally pertain to regular heart beat rates. There is a no proper tool which could simulate both the rhythmic and arrhythmic heart beat rates so that the user can effectively understand the concepts of regular and irregular heart beat rates.

In view of the foregoing discussions, there is a need for a technical solution that can solve the discussed technical problems.

SUMMARY

In an embodiment, a human heart beat simulation apparatus is disclosed. The apparatus comprises a microcontroller, a heart model, a servo motor and a display. The heart model is configured to simulate a heartbeat. The servo motor is coupled to the heart model. The servo motor enables the simulation of the heart beat by the heart model. The apparatus further comprises a control switch and a toggle. The control switch is connected to the microcontroller and the servo motor. The control switch is configured to select a heartbeat rate of the heart model. The toggle switch is connected to the microcontroller and the servo motor. The toggle switch is configured in such a way that, activation of the toggle switch causes an irregular heart beat rate of the heart model. The display is configured to display the heart beat rate of the heart model.

BRIEF DESCRIPTION OF DIAGRAMS

This disclosure is illustrated by way of example and not limitation in the accompanying figures. Elements illustrated in the figures are not necessarily drawn to scale, in which like references indicate similar elements and in which.

DETAILED DESCRIPTION

The following detailed description includes references to the accompanying drawings, which form part of the detailed description. The drawings show illustrations in accordance with example embodiments. These example embodiments are described in enough detail to enable those skilled in the art to practice the present subject matter. However, it may be apparent to one with ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken in a limiting sense.

In this document, the terms "a" or "an" are used, as is common in patent documents, to include one or more than one. In this document, the term "or" is used to refer to a non-exclusive "or", such that "A or B" includes "A but not B", "B but not A", and "A and B", unless otherwise indicated.

Figure 1:
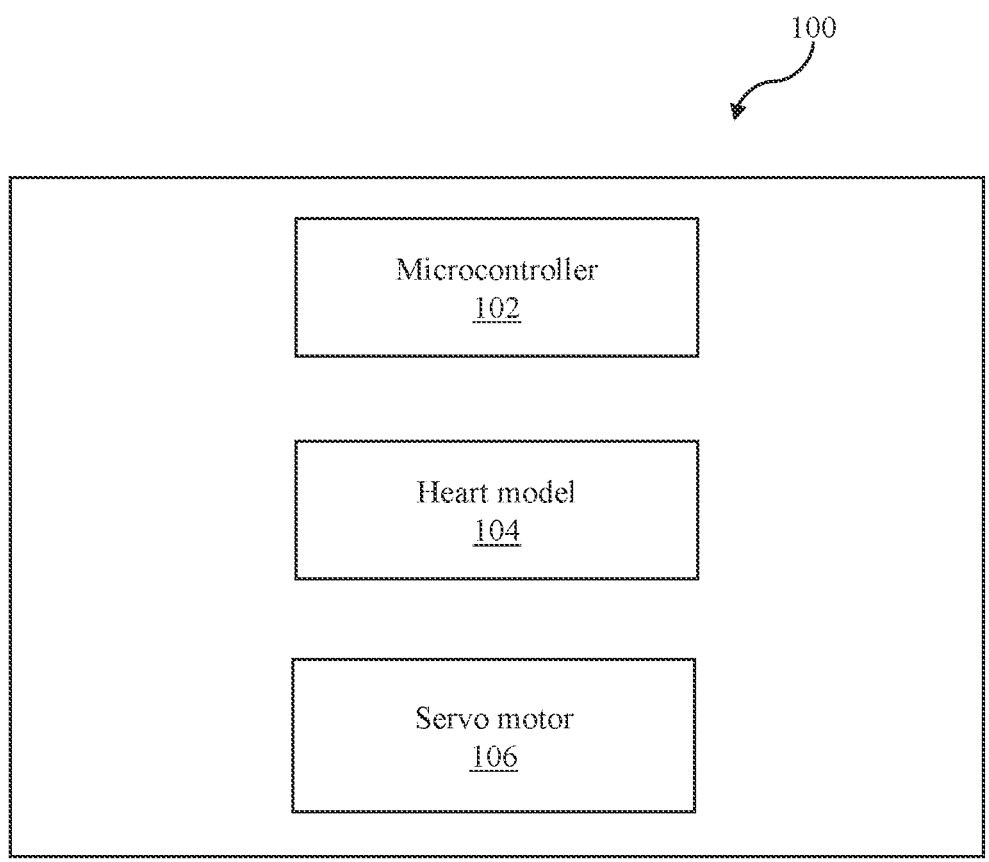
FIG. 1 illustrates a block diagram of a heart beat simulation apparatus 100, in accordance with an embodiment.

Referring to the figures, and more particularly to FIG. 1, an exemplary block diagram of a human heart beat simulation apparatus 100 is disclosed, in accordance with an embodiment. The human heart beat simulation apparatus 100 may comprise a microcontroller 102, a heart model 104 and a servo motor 106. The servo motor 106 may be coupled to the heart model 104 to enable the simulation of a heart beat. The microcontroller may be configured to control the operation of the servo motor thereby controlling the simulation of the heart beat.

Figure 2:
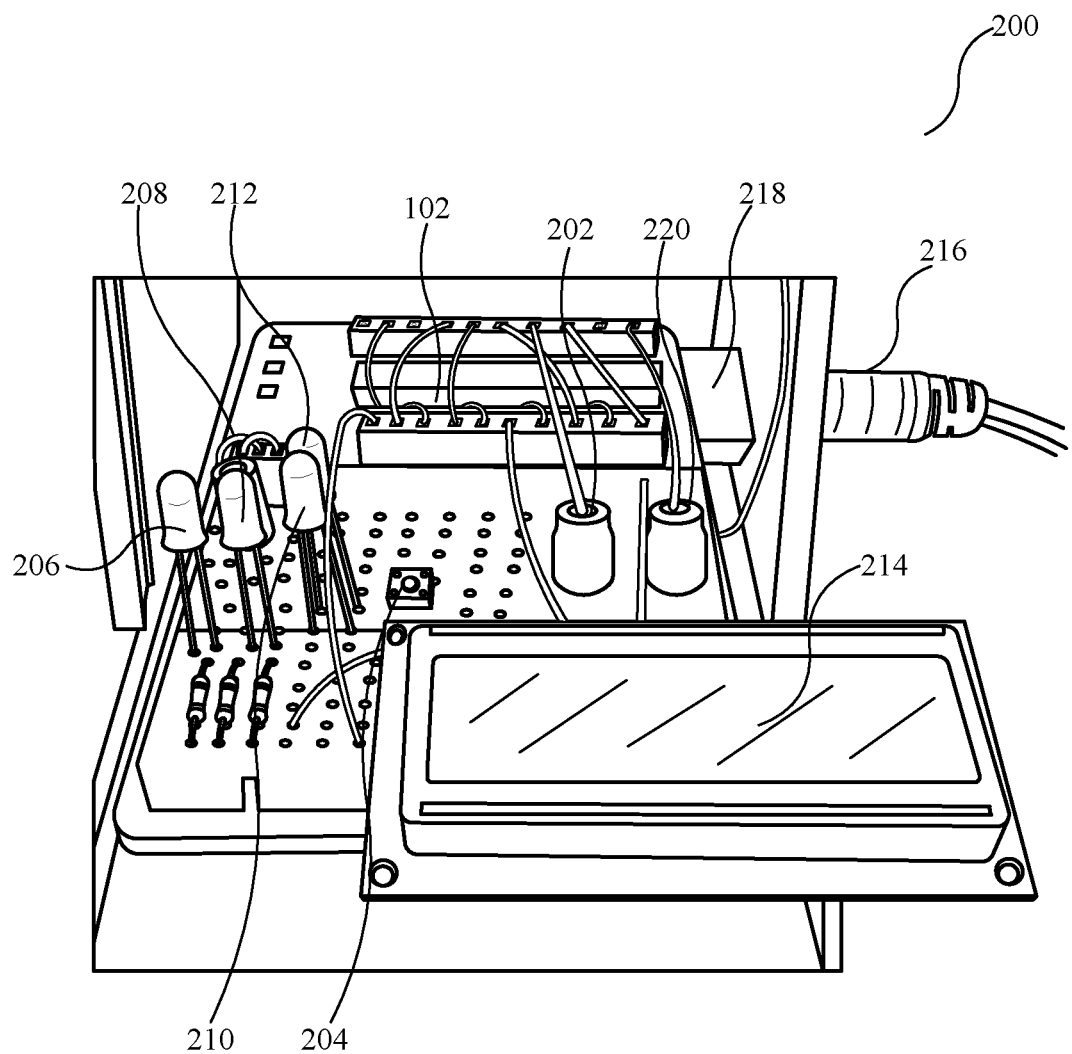
FIG. 2 illustrates a circuitry 300 of the apparatus 100, in accordance with an embodiment.

FIG. 2 illustrates a circuitry 200 of the human heart beat simulation apparatus 100, in accordance with an embodiment. The microcontroller 102 may be an "Arduino" microcontroller board with its own integrated development environment configured with pre-tested software and hardware libraries. The pre-tested data may be uploaded from a computer once and the microcontroller 102 may keep the data until a different data is uploaded.

In an embodiment, the microcontroller 102 may comprise a plurality of pins of power, ground, analog and digital pins. The apparatus 100 may comprise a power input socket 218 configured to be connected to a power cable 216.

In an embodiment, the apparatus may comprise a power module comprising a rechargeable battery configured to power the heart beat simulation apparatus 100. Further, a charging port may be provided through which the rechargeable battery may be charged. The power module may supply 5V power through the power pin which may supply voltage to the microcontroller 102 circuit. The ground pin returns the power back to the microcontroller 102 to complete the circuit.

In an embodiment, the circuitry 200 may comprise a control switch 202, a toggle switch 204, LED indicators 206, 208, 210 and 212 connected to the microcontroller 102.

In an embodiment, the control switch 202 may be a knob like configuration. The control switch 202 may be turned clockwise or anti-clockwise. The control switch 202 may be connected to the microcontroller 102 and the servo motor 106. The control switch 202 may be configured to select a heartbeat rate of the heart model 104. That is to say, the control switch 202 may select heart's BPM (beats per minute).

In an embodiment, the control switch 202 may be connected to the analog pin. The LED indicators 206, 208, 210 and 212 and the servo motor 106 may be connected to the digital pins as outputs since the microcontroller 102 may instruct the digital pins to turn on or off under certain conditions. The toggle switch 204 may be connected to a digital pin.

In an embodiment, the toggle switch 204 may be button like configuration which may be configured to be pressed, in order to switch the apparatus 100 to an irregular heartbeat mode.

In an embodiment, the LED indicators comprises of a first LED indicator 206, a second indicator 208 and a third LED indicators (210, 212). The first LED indicator 206 may be represented by red light, the second LED indicator 208 may be represented by yellow light and the third LED indicators 210, 212 may be represented by green lights. The illumination by the LED indicators 206, 208, 210 and 212 may represent the signals sent to the human heart.

In an embodiment, when the toggle switch 204 is activated and the heart beat rate of the heart is greater than a selected heart beat rate, the microcontroller 102 may cause illumination of the first LED indicator 206, that is the red light. Further, when the heart beat rate of the heart is lesser than the selected heart beat rate, the microcontroller 102 may cause illumination of the third LED indicators 210, 212, that is the green light. As a matter of the fact, the LED indicators 206, 208, 210, 212 may be configured to represent the signals sent to the human heart. Hence, the visual representation of the heart beat rate by the change in colour of lights of LED indicators 206, 208, 210 and 212 may aid in identifying if the irregular heart beat rate is greater or lesser than selected heart beat rate.

In an embodiment, the heart beat rate may be decreased or increased using the control switch 202. The corresponding value of heart beat rate in BPM may be displayed on a display 214.

In one embodiment, the display 214 may be a Liquid-Crystal Display (LCD).

In one embodiment, the apparatus 100 may comprise a display switch 220 configured to control the brightness of the display.

Figure 3:
FIG. 3 illustrates a heart model 104, in accordance with an embodiment.

Now referring to FIG. 3, the heart model 104 may be illustrated, in accordance with an embodiment. The heart model 104 may be a 3D printed device which is made up of PLA (polylactic acid) material. The heart model 104 may be configured to represent constant and inconsistent heart beat rates at which a real heart may beat. The constant heart beat rate may correspond to stable pulse beats which are steady and rhythmic. However, in some people this rhythm is uneven, which may correspond to an irregular pulse. This represents the inconsistent rate at which a real heart beats during potentially threatening situations. The beats per minute (BPM) fluctuates at high to low intervals.

Figure 4:
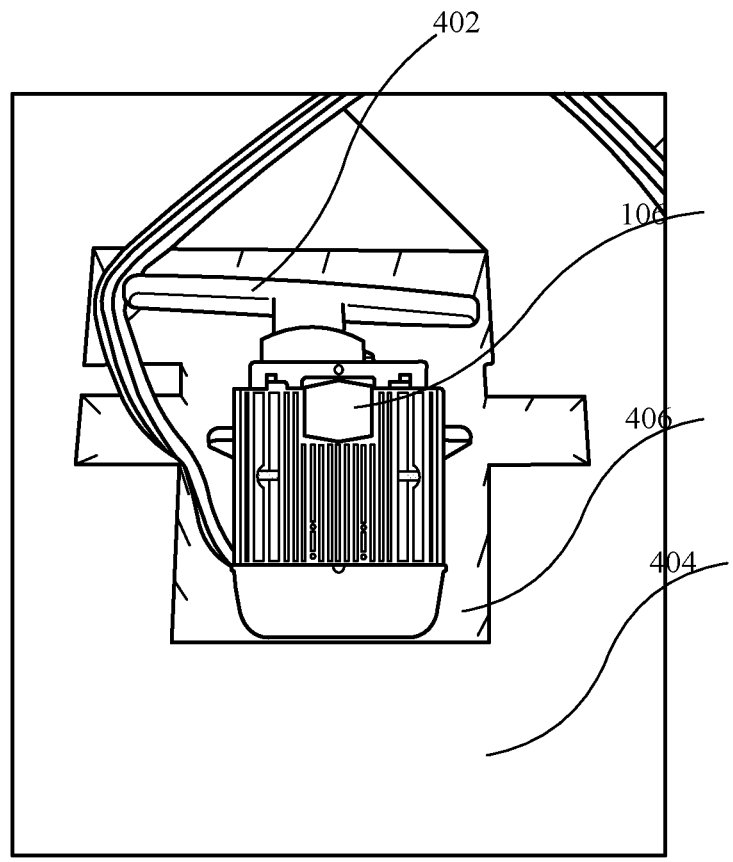
FIG. 4 illustrates a servo motor 106, in accordance with an embodiment.

Now referring to FIG. 4, the servo motor 106 may be illustrated, in accordance with an embodiment. The servo motor 106 may be coupled to the heart model 104. The heart model 104 may be placed on top of the servo motor 106. The apparatus may comprise a rocker arm 402 that is configured to couple the servo motor and the heart model thereby simulating the heart beat.

In an embodiment, the apparatus may comprise a base 404 comprising a cavity 406. The cavity 406 may be configured to receive the servo motor 106.

Figure 5A:
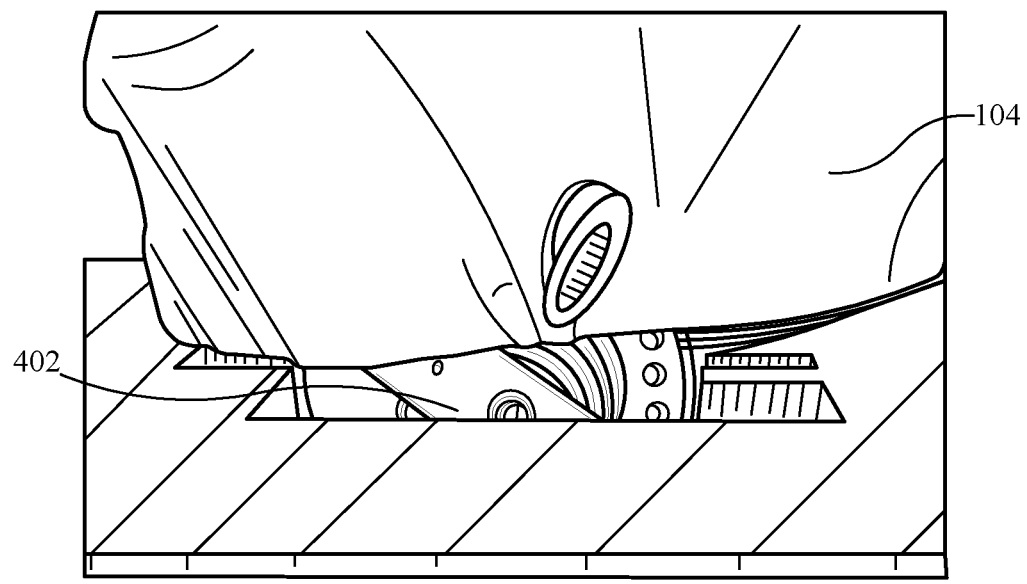
FIGS. 5A-5B illustrates an unraised and raised position of a heart model 104, in accordance with an embodiment.
Figure 5B:
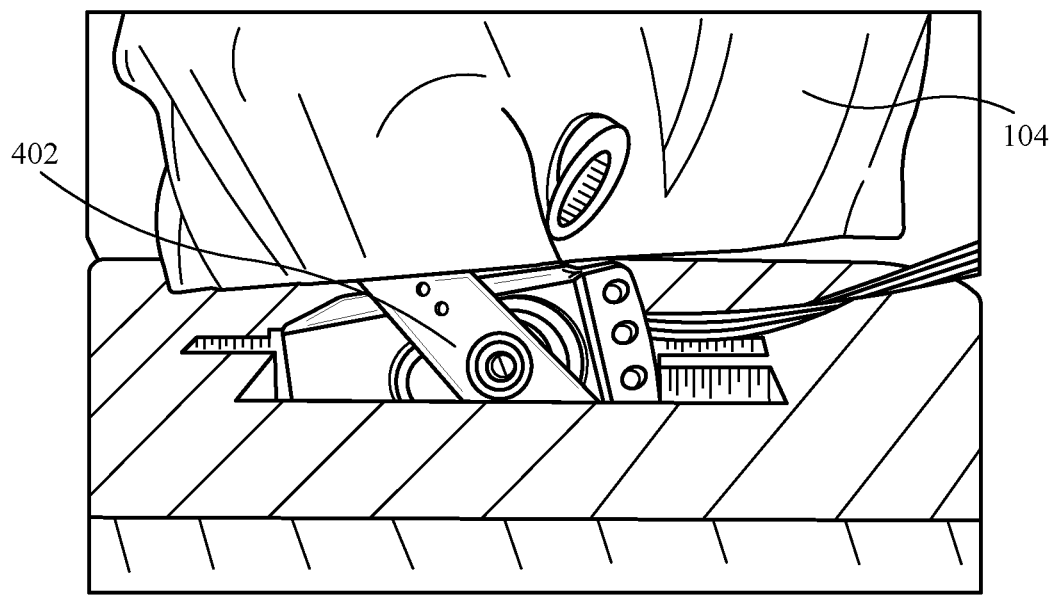

FIGS. 5A-5B illustrates an unraised and raised position of a heart model 104, in accordance with an embodiment. Referring to FIG. 5A, the rocker arm 402 is at a lowered position thereby causing an unraised position of the heart model 104. Referring to FIG. 5B, the rocker arm 402 is at a raised position thereby causing a raised position of the heart model 104.

Figure 6:
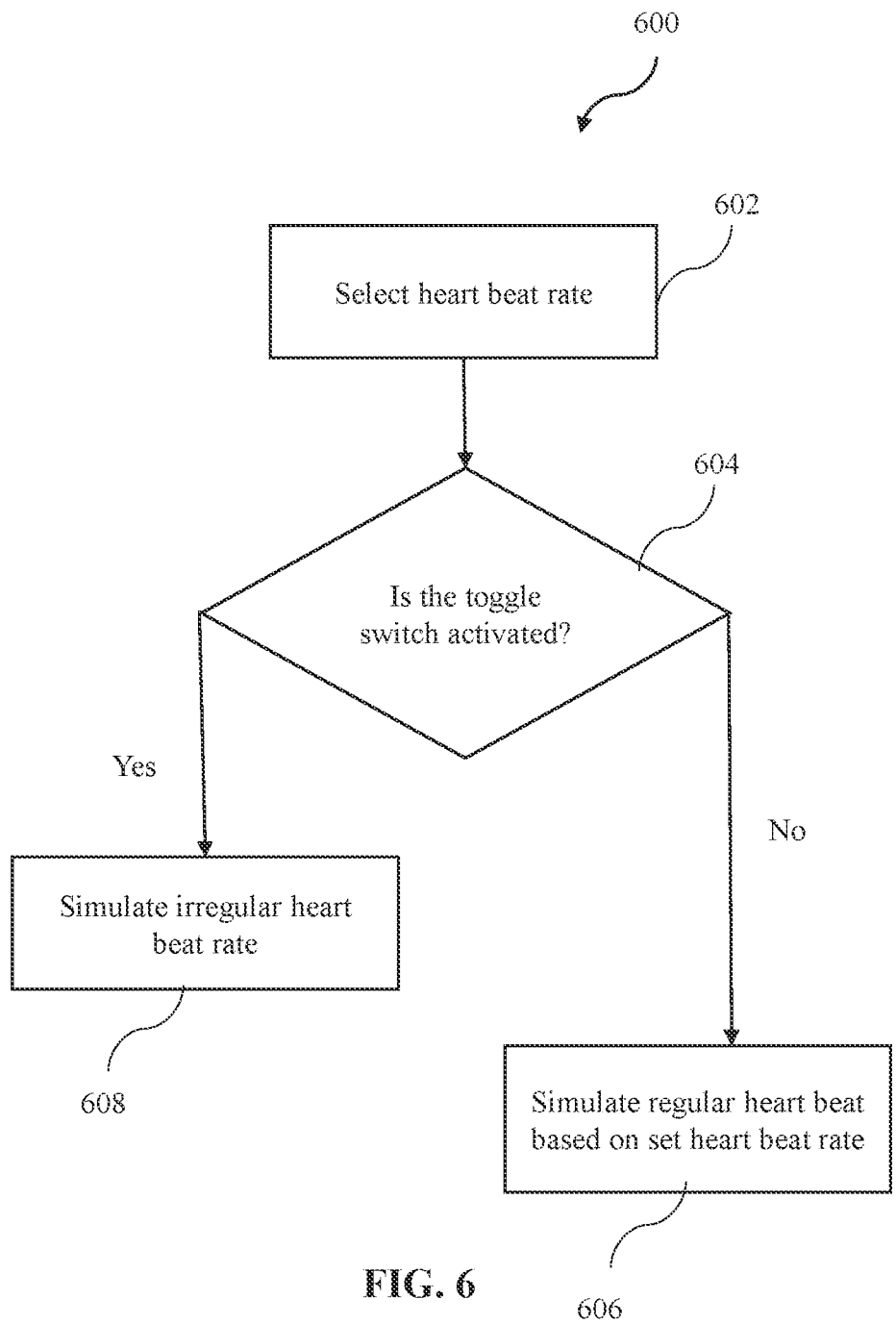
FIG. 6 is a flowchart illustrating simulation of regular and irregular heart beat rates in the apparatus 100, in accordance with an embodiment.

FIG. 6 is a flowchart illustrating simulation of regular and irregular heart beat rates in the apparatus 100, in accordance with an embodiment.

In an embodiment, at step 602, a heartbeat rate value in BPM may be selected using the control switch 202. The microcontroller may initialize the variables in the machine instructions. Further, the selected BPM may be converted to number of milliseconds between each beat. For instance, let's say the selected BPM is 60 BPM. In this case, the time may be computed by dividing the BPM value by 60 seconds (1 minute) that determines a value for ratio of beats per second, that is 1 beat per second. The corresponding obtained value may be converted into milliseconds by multiplying it to 1000. The instant value may correspond to delay between each beat. The delay is already pre-set as 250 milliseconds so that the heart does not immediately jump down. The final wait time between each beat may be computed by subtracting 250 from 1000 milliseconds. Further, the delay may be divided by 4 in order to sync it with LED indicators, configured on the microcontroller 102.

In an embodiment, at step 604, once the servo motor 106 is set up, the microcontroller may determine whether the toggle switch 204 is activated or not.

In an embodiment, at step 606, if there is no activation of the toggle switch 304, heart beat is simulated based on a selected heart beat rate value. That is to say, when the heart beat is regular, the microcontroller 102 may cause the first LED indicator 206 to illuminate followed by the second LED indicator 208 and the third LED indicators 210, 212. That is to say, when there is rhythmic heart beat rate, the red light illuminates first followed by the yellow light and the green lights.

In an embodiment, at step 608, if the toggle switch 204 is activated, microcontroller may cause the servo motor 106 and the heart model to simulate irregular heart beat rate. The activation may be manually done by pressing the toggle switch 204. That is to say, when the toggle switch 204 is activated the heart beat rate of the heart model 104 may be irregular and be either greater or lesser than the selected heart beat rate. When the heart beat rate is irregular, after having pressed the toggle switch 204, the corresponding values representing irregular heart rate may be displayed on the LCD monitor 108.

In one embodiment, the microcontroller 102 may generate a random variable representing the irregular heart beat rate when the toggle switch is activated. In one scenario, the random variable may be generated by adding a value between 10 and 40 to the selected heart beat rate. In one scenario, the random variable may be generated by subtracting a value between 10 and 40 to the selected heart beat rate.

In an embodiment, when the heart beat is irregular, the microcontroller 102 may cause illumination of LED indicators 206, 208, 210, 210 in irregular sequence. That is to say, the microcontroller 102 may cause illumination of the first LED indicator 206, that is red light when the heart beat rate of the heart is greater than the selected heart beat rate and the microcontroller 102. Further, the microcontroller 102 may cause illumination of the third LED indicators 210, 212, that is green lights when the heart beat rate of the heart is lesser than the selected heart beat rate. The red light may represent that the heart beat rate is higher than the selected value from the control switch 202 and the green light may represent that the heart beat rate is lower than the selected value, depicting irregular heart beat rate.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A human heart beat simulation apparatus, the apparatus comprises:
    a heart model configured to simulate heart beat;
    a servo motor coupled to the heart model enabling the simulation of heart beat by the heart model;
    a microcontroller connected to the servo motor, wherein the microcontroller is configured to control the operation of the servo motor;
    a control switch connected to the microcontroller and the servo motor, wherein the control switch is configured to select a heartbeat rate of the heart model;
    a first LED indicator;
    a second LED indicator;
    a third LED indicator;
    a toggle switch connected to the microcontroller and the servo motor, wherein the activation of the toggle switch causes an irregular heart beat rate of the heart model,
    wherein when the toggle switch is activated and the heart beat rate of the heart model is irregular, the microcontroller causes:
        the first LED indicator to illuminate when the heart beat rate of the heart model is greater than the selected heart beat rate; and
        the third LED indicator to illuminate when the heart beat rate of the heart model is lesser than the selected heart beat rate; and
    a display configured to display the heart beat rate of the heart model.

2. The apparatus of claim 1, wherein when the toggle switch is not activated and the heart beat rate of the heart model is regular, the microcontroller causes the first LED indicator to illuminate followed by the second LED indicator and the third LED indicator.

3. The apparatus of claim 2, wherein the illumination of the first LED indicator, the second LED indicator and the third LED indicator represents the signals sent to the human heart.

4. The apparatus of claim 1, wherein the apparatus comprises a rocker arm configured to couple the servo motor and the heart model to enable simulation of heart beat.

5. The apparatus of claim 1, wherein the control switch is rotated clockwise or anti-clockwise to select the heartbeat of the heart model.

6. The apparatus of claim 1, wherein the heart model is made using a 3-D printing technology.

7. The apparatus of claim 6, wherein the heart model is made using a polylactic acid material.

8. The apparatus of claim 1, wherein the apparatus comprises a power module, the power module comprises:
    a rechargeable battery configured to power the apparatus; and
    a charging port via which the rechargeable battery is charged.

9. The apparatus of claim 1, wherein the apparatus comprises a base configured to hold the servo motor and the heart model.

10. The apparatus of claim 9, wherein the base defines a cavity configured to receive the servo motor.

11. The apparatus of claim 8, wherein the apparatus comprises a power input socket configured to engage with the rechargeable battery.

12. The apparatus of claim 1, wherein the apparatus comprises a display switch configured to control the brightness of the display.

* * * * *